Oct. 17, 1967   R. NELSON   3,346,897
FLAT CONDUCTOR CABLE STRIPPING MACHINE
Filed Aug. 3, 1964   2 Sheets-Sheet 1

INVENTOR.
ROY NELSON
BY George C. Sullivan
Agent

Oct. 17, 1967  R. NELSON  3,346,897
FLAT CONDUCTOR CABLE STRIPPING MACHINE
Filed Aug. 3, 1964  2 Sheets-Sheet 2

INVENTOR.
ROY NELSON
BY
Agent

United States Patent Office

3,346,897
Patented Oct. 17, 1967

3,346,897
FLAT CONDUCTOR CABLE STRIPPING MACHINE
Roy Nelson, Burlingame, Calif., assignor to Lockheed Aircraft Corporation, Burbank, Calif.
Filed Aug. 3, 1964, Ser. No. 387,123
5 Claims. (Cl. 15—97)

ABSTRACT OF THE DISCLOSURE

This invention relates to a device for removing insulation from flat, flexible cable. The cable is securely held by a pair of holding bars positioned across the cable. Each holding bar has a knife-like edge adjacent the insulation to be removed. A rotating wheel made of a buffing material is passed over the surface of the tape cable so the motion of the wheel surface is parallel to the holding bars, and generally transverse to the tape cable, thereby removing the desired insulation.

---

The present invention relates in general to an apparatus for removing insulating material from the metal conductor traces of multi-trace flat conductor cable and in particular to a machine to remove the insulating material without damaging the metal conductor traces in any manner.

The use of multi-trace flat conductor cable is growing rapidly for both commercial and military applications. The replacement of an outdated cable harness system, hand-made of round, stranded, insulated wire, is rapidly approaching. The purpose of flat conductor cable is to keep pace with the electronics parts progress, circuitry design and modern packaging techniques. Some of the advantages of flat conductor cable over cables of handmade, round wire cables are cable weight savings in the order of 45% to 70% and cost savings up to 80%. The reliability improvement of flat cable conductors over multi-trace round cables, probably the most important feature, especially in the aerospace field, is even more impressive. There is no need to apply either a heat-sealing or heat-curing plastic to flat cable conductors, as most are manufactured that way. Round wire cable cannot stand any flex test comparable with flat conductor cables. These and many other advantages applicable to the particular use to which the cable is to be employed are obvious; however, problems do exist.

One of the major problems now facing users of multi-trace flat conductor cable is in cable end preparation. Three basic methods have been investigated to strip cable ends of their insulation and shielding: heat, abrasion, and chemical action. None have achieved the degree of success needed for industry acceptance.

It is the object of the present invention to provide a simple, practical tool for removing any known insulating material or other protective coatings, including electrical shielding, from multi-trace flat conductor cable.

One feature of the present invention is that insulating material is removed without scraping, nicking, cutting or otherwise damaging the metal conductor traces.

Another feature of the present invention is the use of a novel holding and positioning device for the flat conductor cable to provide a sharp, clean outline of the exposed metal conductor trace and the remaining insulation over the entire width of the flat conductor cable.

Another feature of the present invention is to provide for removal of insulating or other coating material from either or both sides of flat conductor cable of various thickness and widths.

Another feature of the present invention is to provide for removal of insulating or other coating material from a single metal conductor trace or as many metal conductor traces as desired.

Figure 1:
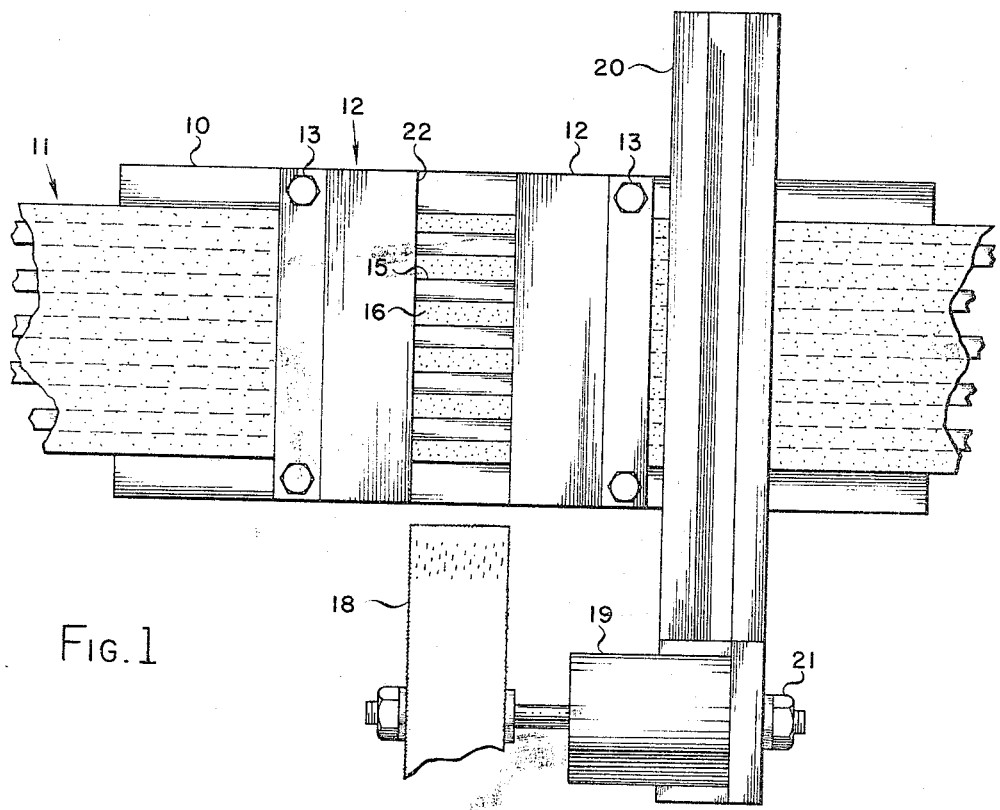
Figure 2:
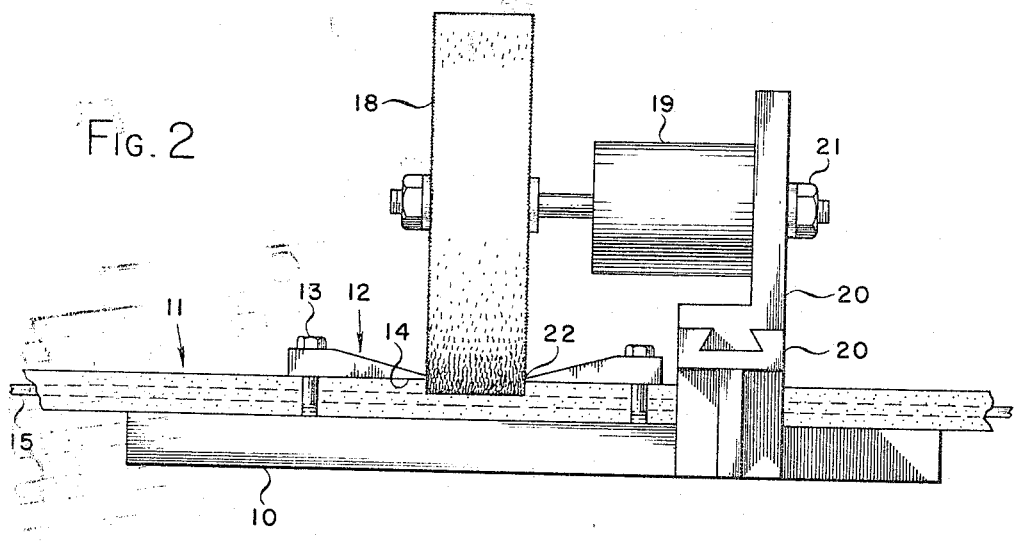
Figure 3:
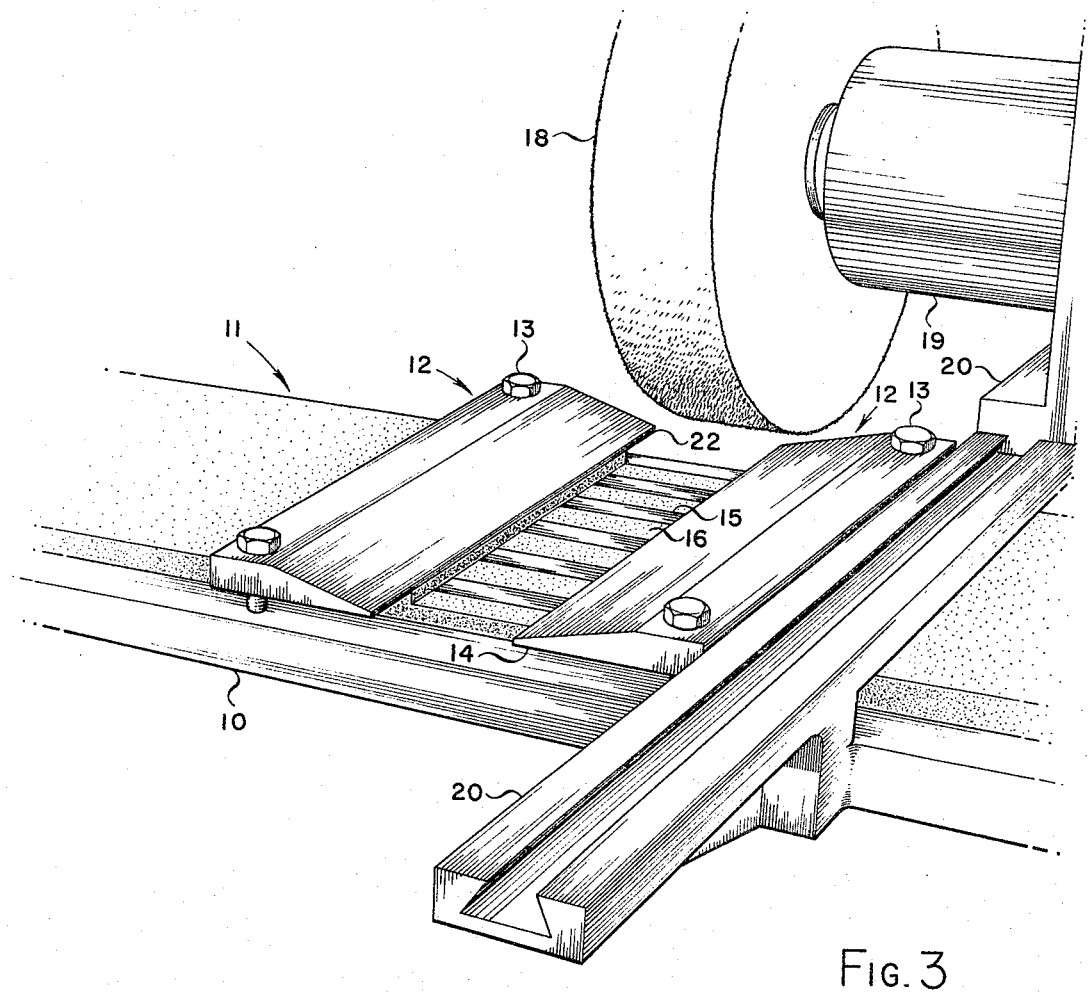
Figure 4:
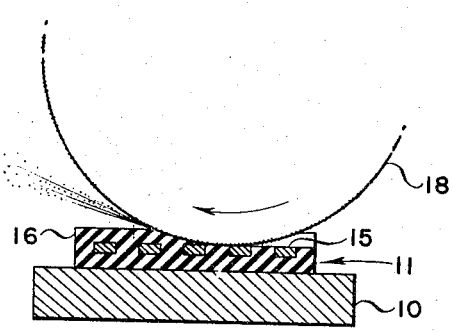

These and other features and advantages of the present invention will become apparent upon perusal of the following specification and drawing of which:

FIGURE 1 is a top view of the present invention,
FIGURE 2 is a side elevational view of the present invention,
FIGURE 3 is a perspective view of the present invention,
FIGURE 4 is an enlarged fragmentary side elevation view of the stripping mechanism.

Referring now to the drawings, an elongated base plate 10, of aluminum or other suitable material, is provided as a solid support base to hold a multi-trace flat conductor cable 11, hereafter called flat conductor cable, including a plurality of uniformly spaced, insulated flat metal conductor traces 15. A pair of holding bars 12 hold the flat conductor cable 11 firmly in position upon base plate 10. Holding bars 12 in their preferred embodiment have a flat bottom surface 14 extending across the width of flat conductor cable 11. Also they must have a sharp, knife-like edge 22 adjacent to the surface of the flat conductor cable being stripped of insulation. It is noted that the exact form or shape of holding bars 12 is unimportant. The holding bars must perform two main functions: (1) they must hold cable 11 firmly in position upon base plate 10, and (2) provide a clean, sharp outline of the exposed metal conductor traces. Holding bars 12 are secured to base plate 10 by nut and bolt pairs 13 or any other suitable means.

A wheel, 18, of a fabric such as cotton, linen, chamois, felt, and the like, attached to a suitable drive means such as an electric motor 19, provides the actual process functions of removing the coating or insulating material 16 from multi-trace flat cable 11. Wheel 18 is made of a material which will remove the insulation material including polyester (Mylar), "H" film (a polyimide) and fluorocarbon (Teflon) and others of varying thickness and width. Wheel 18 must not damage the metal traces in any manner. For the purpose of the present invention, we can define the material from which wheel 18 is composed as a "buffing" material, which would include, but not necessarily be limited to, the materials mentioned above.

The face width of wheel 18 can be varied as desired, for example, from between ⅛ inch to 2 inches, depending on the width of insulation to be removed. Wheel 18 is typically of from 2 to 4 inches in diameter and driven fast enough to remove the insulation but not so fast as to rip or tear, for example, at speeds of 4,500 to 15,000 r.p.m. depending upon the depth of insulating material to be removed and the diameter of the wheel. It has been found that a wheel passing through the insulation with surface speed of rotation of 3500 feet per minute is suitable for removale of most insulations. Wheel 18 is usually positioned with its axis of rotation parallel to the direction of the metal conductor traces 15, and is passed transversely across multi-trace cable 11, between holding bars 12 by any suitable carriage or transport means 20. There may be occasions, however, when it is desirable to strip at an angle. The position of wheel 18 in a vertical sense will depend upon the depth of thickness of the insulating material 16 that will be removed. For example, if the thickness of the multi-trace flat conductor cable is 10 mils and the metal conductor traces are 2 mils thick and positioned 3 mils from the upper and lower surface, the wheel is positioned so its peripheral surface is 3 mils below the upper surface of the cable. As the thickness of the insulation material to be removed increases, the speed of the wheel must be increased to remove all of the insulating material in one pass of the wheel across the cable. For some very hard insulating materials, it may be necessary to use a solid abrading wheel, for example, an abrasive charged wheel, to make a first rough cut. Tough insulation such as Teflon is readily removed. A second pass with a wheel of a softer material is then made. Any convenient means may be used to control the vertical disposition of wheel 18 in relation to the cable. For example, a mounting bolt 21 may be used to raise or lower motor 19 and wheel 18. A stripping mechanism to be used on many different thicknesses of cable may be equipped with a micrometer setting to conveniently and accurately move wheel 18 up and down as desired.

During operation, the peripheral speed of wheel 18 over the multi-trace flat cable 11 reduces the insulating coating therefrom to a gummy, granule or powder form. The wheel pushes or scatters the removed material ahead in the wheel path, and completely removes the insulating material from metal conductor 15 with no damages to metal conductor traces 15 whatever. For more effective and efficient stripping, the surface of wheel 18 can be cleaned with a medium coarse grit sandpaper, or a new wheel can be applied as needed, so that a reasonably clean wheel surface is available to insure removal of insulating material. After removal of the insulating material from one side of multi-trace cable 11, nuts and bolts 13 are loosened, cable 11 slipped from under holding bars 12 and turned over, re-inserted under holding bars 12 and bolts 13 are re-tightened and the stripping operation is then repeated to remove the insulating material from the second or reverse side of multi-trace flat cable 11.

By using the apparatus as described above, insulating material can be removed from end or center or one or both sides, from any desired number of metal traces. If, for example, it is desired to remove the insulating covering from a single metal conductor trace, a flat, thin metal shield similar to an eraser shield used by draftsmen is positioned over the metal conductor trace, with the insulating material to be removed exposed. Wheel 18 is passed over the exposed area to remove the insulating material as described above.

It is noted that the stripping mechanism shown and described above is depicted and described in its most basic form. It is within the skill of any machine designer to apply the invention as shown and described herein to a machine, either hand-operated, semi-automatic or completely automated, to perform the operation of stripping insulating material from a single or double shielded electrical multi-trace flat conductor flexible cable.

The stripping mechanism may be used on conductors and materials of varying thickness, including polyester (Mylar), "H" film (a polyimide), fluorocarbon (Teflon), vinyl, Kel-F, glass-covered Teflon, and other insulating materials.

After the insulation and shielding have been removed from the cable, the surface of the metal conductor traces are free of all protective coatings, adhesives, and are in a condition presentable for electroplating or immediate soldering. The exposed conductors do not possess any deformation or defect due to the stripping mechanism.

It is noted that a machine having a second wheel located below the flat cable from which the insulation material is to be removed is within the scope and meaning of this invention. The second wheel should be off-set in relation to the first wheel. A firm support base would be necessary to support the second wheel, along with a second pair of holding bars. During operation, the flat cable would be stripped of insulation on one side, then the region to be stripped would be removed in position adjacent to the second wheel, since it is necessary to provide a secure base under the portion being stripped.

What is claimed is:

1. A machine for removing insulating material from conductor cable of flat conductor traces comprising: means for securely holding a flat conductor cable, said means including a knife-like edge positioned across the width of said flat conductor cable adjacent the insulating material to be removed; buffing material; means for passing said buffing material across the surface of the insulating material to be removed in a direction substantially parallel to the knife-like edge whereby the movement of the buffing material across the flat conductor cable removes the insulating material.

2. The machine according to claim 1 whereby said means for securely holding a flat conductor cable include a holding bar member, said holding bar member including a flat bottom surface extending across the width of a flat conductor cable to be stripped of insulation.

3. The machine according to claim 2 whereby said means for passing said buffing material across the surface of the insulating material include a wheel member and driving means for rotating said wheel member.

4. The machine according to claim 3 whereby the axis of rotation of said wheel member is positioned substantially normal to the knife-like edge of said holding bar.

5. A machine for removing insulating material from conductor traces of flat conductor cable comprising: a base plate, a pair of holding bars, means for mounting said holding bars on said base plate, said base plate and pair of holding bars for securely holding a flat conductor cable, said holding bars each including a knife-like edge positioned adjacent the insulating material to be removed; a buffing wheel, means for rotating said buffing wheel; said buffing wheel composed of a material adaptable to remove the insulating material from said flat conductor cable, means for passing said buffing wheel across the surface of a flat conductor cable between the knife-edges of said holding bars.

References Cited

UNITED STATES PATENTS

| 756,058 | 3/1904 | Royle | 269—93 |
| 1,904,274 | 4/1933 | Crowley | 51—217 X |
| 2,225,200 | 12/1940 | Ames | 51—21 |
| 2,457,811 | 1/1949 | Emrich | 51—268 |

CHARLES A. WILLMUTH, *Primary Examiner.*

L. G. MACHLIN, *Assistant Examiner.*